2,850,535

LOW FOAMING NON-IONIC SURFACE-ACTIVE AGENTS

Earl W. Lane, Philadelphia, Pa., assignor to Rohm & Haas Company, Philadelphia, Pa., a corporation of Delaware No Drawing. Application July 10, 1957
Serial No. 670,860

10 Claims. (Cl. 260—613)

This invention deals with specific low foaming non-ionic surface-active agents and to a method for their preparation. It more particularly concerns low foaming non-ionic surface-active agents which are made from the corresponding high foaming agents in the presence of a specific catalyst to be more fully described hereinafter.

Compounds of this invention are made by heating a compound of the formula

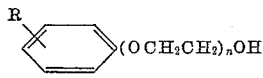

in which R is an alkyl group of eight to nine carbon atoms and $n$ is an integer of seven to sixteen in the presence of a specific acidic catalyst. The alkylphenoxypolyethoxyethanol reactants are well known compositions of matter that have advantageous detergents and wetting characteristics and very high foam. While the detergent properties are admirable these high foaming qualities adversely affect the performance of the detergent in many practical applications. Therefore, although the stated alkylphenoxypolyethoxyethanols have good detergent characteristics, their use is frequently prohibited because of their extremely high foaming characteristics. This is particularly so in many commercial and residential automatic mechanical applications, such as dishwashing and clotheswashing. Therefore, it would be highly desirable to produce a compound of the alkylphenoxypolyethoxyethanol type that had good detergency and low or no foam. It would be particularly advantageous to prepare such a compound from the corresponding high foaming alkylphenoxypolyethoxyethanols.

It is the principal object of this invention to prepare a low foaming surface-active agent from the corresponding high foaming surface-active alkylphenoxypolyethoxyethanol. It is a further object to prepare such a low foaming surface-active agent with enhanced detergent characteristics. Further objects will be apparent hereinafter.

The temperatures employed in the present reaction range from 160° to 250° C. preferably 170° to 210° C. When the higher temperatures are used, reaction times are generally shorter, and when the lower temperatures are employed reaction times are somewhat longer. Reaction times in the range of minutes, such as two to three, to three hours are generally adequate with one-quarter to two and one-half hours being the usual time for consummating the reaction. The reaction may be conducted on a continuous or batch basis. Yields are consistently in excess of 90 to 93% whether the reaction is run on a continuous or batch basis. The actual length of reaction time is not particularly critical except that it frequently reflects on the yield with the longer times generally producing the high yields, but this may be varied as desired. Actually, a better criterion for reaction completion is based on the cloud point and the foaming characteristics of the product. As the reaction progresses the cloud point and the amount of foam produced gradually decrease. The reaction is continued until a minimum amount of foam is generated by the product, preferably with the smallest concurrent decrease in the cloud point. In any case, the reaction should be terminated when the cloud point reaches about 20° C., preferably 30° C. or above. Cloud points of about 30° to about 70° C. are particularly satisfactory as long as the foam is about minimum. The cloud point and foam are evaluated in aqueous solutions in a standardized test.

The catalyst that may be used in this invention is of a particular acidic type. There may be employed acid treated clays, such as bentonite, montmorillonite, pyrophyllite, talc, hydrous, micas, kaolin, and the like. The acid used in the treatment is a strong acid such as sulfuric, hydrochloric, and the like in a manner understood in the art. There may also be employed strongly acidic cation-exchange resins, such as sulfonated cross-linked polystyrene cross-linked with divinylbenzene, diallyl maleate, and the like, sulfonated phenolic-formaldehyde condensates, ω-sulfonated phenolic-formaldehyde condensates, and sulfonated coals.

The compounds produced by the method of the present invention have markedly increased detergency over the reactants. They have as good or better wetting characteristics and they consistently exhibit low or no foam. The process is readily consummated, easily reproducible, and economical. The surprising net result is that there is produced from a high foaming detergent reactant a low or no foam detergent product, which has at least comparable and frequently better detersive characteristics.

The compounds of this invention and the method of their preparation may be more accurately understood from the following examples which are offered by way of illustration and not by way of limitation. Parts by weight are used throughout.

Example 1

There are added to a reaction vessel 600 parts of octylphenoxypolyethoxyethanol in which there are 9.7 ethoxy units and 75.6 parts of acid-treated bentonite. The reaction vessel is equipped with a Dry Ice trap. The reaction mixture is heated at 175° to 200° C. for one hour and 50 minutes. During this time there was a net loss in weight of 21.7 parts. The product was isolated by filtering and then stripping under water vacuum at 150° C. temperature. The yield of product is 96%. The product has a cloud point of 46° C. The detergency of the product is 10% better when evaluated against oily cotton and was twice as good as the reactant with regards to redeposition of soil. The foam of the product was about ⅛ that of that reactant which is evaluated in a standard test. The product is usable in an automatic mechanical dishwasher of standard make, whereas the reactant foams to such an extent that the machine stalls.

In a similar way, there is prepared from nonylphenoxypolyethoxyethanol containing 16 ethoxy units corresponding to the product of this invention by heating the reactant at 165° to 185° C. for two hours and 45 minutes. This product is somewhat superior in detergency and redeposition of soil to the reactant, somewhat superior in wetting characteristics, and exhibits only about ⅛ of the foam produced by the reactant.

Example 2

There are added to a reaction vessel 750 parts of octylphenoxypolyethoxyethanol containing 12.5 ethoxy units and 60 parts of sulfonated cross-linked polystyrene cation-exchange resin. The reaction mixture is heated at 160° to 175° C. for one and one-half hours. The reaction mixture is filtered and stripped under water vacuum at 150° C. temperature. There is a net loss in weight of 67.5 parts. The yield of product is 91%. It has a cloud point of 56° C. The product is equal in wetting characteristics to the reactant. It has slightly better detergent and redeposition properties and exhibits about 1/30 the foam of the reactant.

In a similar way, there is prepared the product of this invention from nonylphenoxypolyethoxyethanol containing 8 ethoxy units by employing a sulfonated phenolic-formaldehyde resin condensate. The product is superior to the reactant in wetting, detergent, deposition, and low foam characteristics.

*Example 3*

There are heated at 195° to 230° C. for two hours 800 parts of octylphenoxypolyethoxyethanol having 16 ethoxy units and 88 parts of acid treated bentonite. The reaction mixture is filtered and stripped. There is a loss in weight of 32 parts indicating a yield of 96%. The product has a cloud point of 42° C. and has less than 1/6 the foam of the reactant. The product is nearly twice as effective in wetting agent as the reactant, it was equal in detergency and markedly superior in redeposition qualities.

A very similar type of product is obtained by repeating the above example employing acid-treated kaolin as the catalyst.

I claim:

1. A method for the preparation of a low foaming nonionic surface-active agent which comprises heating a compound having the formula

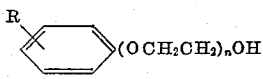

wherein R is an alkyl group of 8 to 9 carbon atoms and $n$ is an integer of 7 to 16, at a temperature of about 160 to 250° C. for about two minutes to three hours in the presence of an acidic catalyst from the group consisting of strongly acidic cation-exchange resins and acid treated clays.

2. A method for the preparation of a low foaming nonionic surface-active agent which comprises heating a compound having the formula

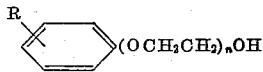

wherein R is an alkyl group of 8 to 9 carbon atoms and $n$ is an integer of 7 to 16, at a temperature of 170° to 210° C. for about one-fourth to two and one-half hours in the presence of an acidic catalyst from a group consisting of strongly acidic cation-exchange resins and acid treated clays.

3. A method for the preparation of a low foaming nonionic surface-active agent which comprises heating a compound having the formula

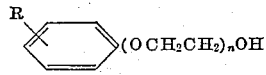

wherein R is an alkyl group of 8 to 9 carbon atoms and $n$ is an integer of 7 to 16 at a temperature of 160° to 250° C. for about two minutes to three hours in the presence of a strongly acidic cation-exchange resin.

4. A method for the preparation of a low foaming nonionic surface-active agent which comprises heating a compound having the formula

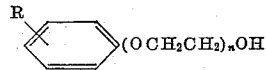

wherein R is an alkyl group of 8 to 9 carbon atoms and $n$ is an integer of 7 to 16 at a temperature of 160° to 250° C. for about two minutes to three hours in the presence of an acid-treated clay.

5. A method for the preparation of a low foaming nonionic surface-active agent which comprises heating a compound having the formula

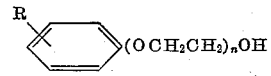

wherein R is an alkyl group of 8 to 9 carbon atoms and $n$ is an integer of 7 to 16 at a temperature of 160° to 250° C. for about two minutes to three hours in the presence of an acid treated bentonite.

6. A composition of matter prepared according to the process of claim 1.

7. A composition of matter prepared by the process of claim 1 in which R is an octyl group.

8. A composition of matter prepared by the process of claim 1 in which R is a nonyl group.

9. A composition of matter prepared by the process of claim 1 in which the cloud point is at least about 30° C. and no higher than about 70° C.

10. The composition of claim 9 in which the foam produced is substantially at the minimum.

References Cited in the file of this patent

UNITED STATES PATENTS

| | | |
|---|---|---|
| 2,273,622 | Bruson | Feb. 17, 1942 |
| 2,496,582 | Enyeart | Feb. 7, 1950 |
| 2,733,272 | Horsley et al. | Jan. 31, 1956 |
| 2,812,360 | Mills et al. | Nov. 5, 1957 |